United States Patent [19]

Lacy

[11] 4,159,486

[45] Jun. 26, 1979

[54] COMPOSITE VIDEO WAVEFORM GENERATOR

[75] Inventor: Robert H. Lacy, Bartlesville, Okla.

[73] Assignee: Phillips Petroleum Company, Bartlesville, Okla.

[21] Appl. No.: 869,986

[22] Filed: Jan. 16, 1978

[51] Int. Cl.² ............................................. H04N 5/38
[52] U.S. Cl. .................................... 358/186; 358/160
[58] Field of Search ..................... 358/186, 141, 160

[56] References Cited

U.S. PATENT DOCUMENTS

| 3,487,162 | 12/1969 | Gordon et al. ................... 358/186 |
| 3,699,258 | 10/1972 | Torek ................................ 358/186 |

*Primary Examiner*—Richard Murray

[57] ABSTRACT

The generation of a composite video waveform from three signals representing video data, blanking, and synchronization information is accomplished by supplying the video data, blanking and synchronization signals to the cathode side of three different diode circuits. The three different diode circuits are tied to a common voltage source on the anode side of the diode circuits. The forward voltage drop across the diode circuits determines the signal level seen by a video monitor in response to the video data, blanking and synchronization signals. In a preferred embodiment, at least one Schottky diode is utilized in each diode circuit to provide sharp edge definition for the composite video waveform. In a less preferred embodiment, conventional silicon switching diodes are used to replace the Schottky diodes but a sacrifice in edge definition for the composite video waveform results.

12 Claims, 2 Drawing Figures

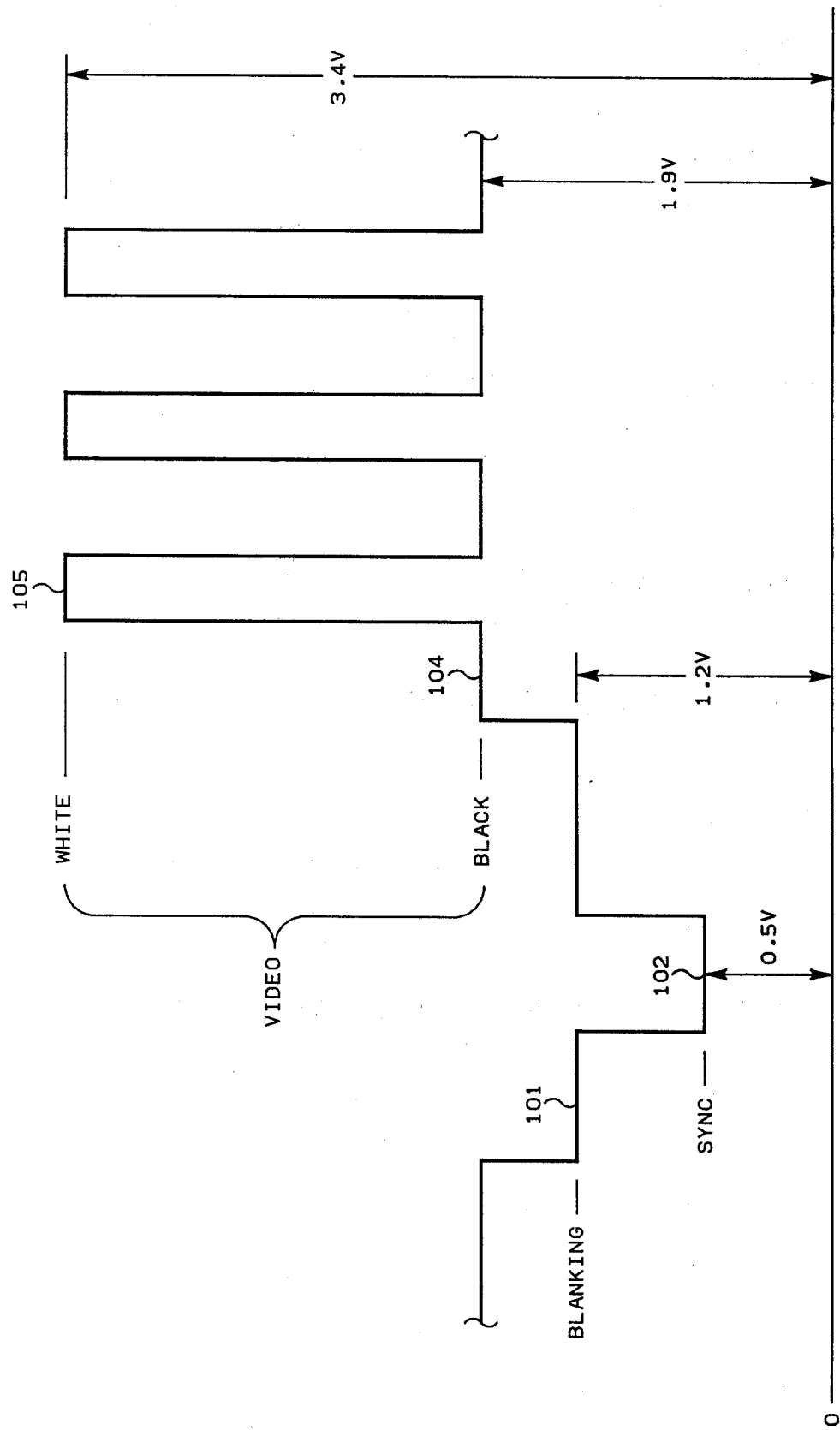

COMPOSITE VIDEO WAVEFORM GENERATOR

This invention relates to method and apparatus for generating a composite video waveform. In a specific aspect, this invention relates to method and apparatus for generating a composite video waveform from three digital signals representing video data, blanking and synchronization information. In a second specific aspect, this invention relates to method and apparatus, for generating a composite video waveform from three digital signals representing video data, blanking and synchronization information, which utilizes only one power supply, has improved rise and fall time characteristics, provides a stable composite video waveform, and is easily implemented, repaired and maintained.

It is well known to utilize signals representing video data, blanking and synchronization to display data or a video scene on a video monitor such as a cathode ray tube (CRT) terminal or television screen. In order to display the data or scene, the signals must be combined into what is commonly referred to in the art as a composite video waveform.

Many circuits for forming the composite video waveform have been described in the prior art. However, these circuits often do not provide a composite video waveform made up of clean square wave pulses and the circuits are often complicated and difficult to implement and maintain. The composite video waveforms which represent the prior art are often characterized by pulses having slow rise and fall times. The pulses also have the stability problems of overshoot and ringing. The circuits often require two power supplies and are complicated to the point that implementation is difficult and it is difficult for a technician to repair and maintain the circuits.

Accordingly, it is an object of this invention to provide method and apparatus for generating a composite video waveform. A second object of this invention is to provide method and apparatus for generating a composite video waveform from three digital signals representing video data, blanking and synchronization information. A third object of this invention is to provide method and apparatus, for generating a composite video waveform from three digital signals representing video data, blanking and synchronization information, which utilizes only one power supply, has improved rise and fall time characteristics, provides a stable composite video waveform, and is easily implemented, repaired and maintained.

In accordance with the present invention, method and apparatus is provided whereby a composite video waveform, suitable for driving CRT monitors or other similar video monitors, can be generated with a circuit that uses diodes to set the luminance, blanking and synchronization voltage levels. In a preferred embodiment, Schottky barrier diodes are utilized in the circuit to provide fast, clean pulses free of overshoot and ringing, with rise and fall times of about 12 nanoseconds. Silicon switching diodes may be substituted for the Schottky diodes but slower rise and fall times of the silicon switching diodes will result in a sacrifice in edge definition.

A composite video waveform, capable of being utilized to display digital alphanumeric data, is usually made up of four discrete voltage levels—synchronization, blanking, black, and white. Various combinations of diode arrays are utilized to set these four discrete voltage levels in accordance with the input requirements of the video monitor or the requirements of an industry standard.

The composite video waveform which has been formed by the diode arrays is transmitted to the video monitor or other similar device over a coaxial cable. A series-complementary emitter-follower pair, made up of a pair of transistors and associated resistors, provides a high input impedance buffer for driving the coaxial cable. A resistor is used in series with the output of the second transistor of the emitter-follower pair to increase the output impedance of the second transistor, preventing oscillation in the event an unterminated coaxial cable is connected as well as protecting the circuit against a shorted output.

The circuit for forming the composite video waveform requires only one power supply. The circuit is also easily implemented because of its simple design. No adjustments are necessary once the circuit has been implemented and the circuit layout is not critical. All signals are direct coupled through the circuit. Also the circuit is easily maintained and is easily repaired by a technician should a part of the circuit fail. The circuit provides a very clean composite video waveform which is capable of carrying video data at a high data rate.

Other objects and advantages of the invention will be apparent from the description of the invention and the appended claims thereto as well as from the detailed description of the drawings in which:

FIG. 2 is a representation of the composite video waveform output by the circuit of FIG. 1.

Figure 1:
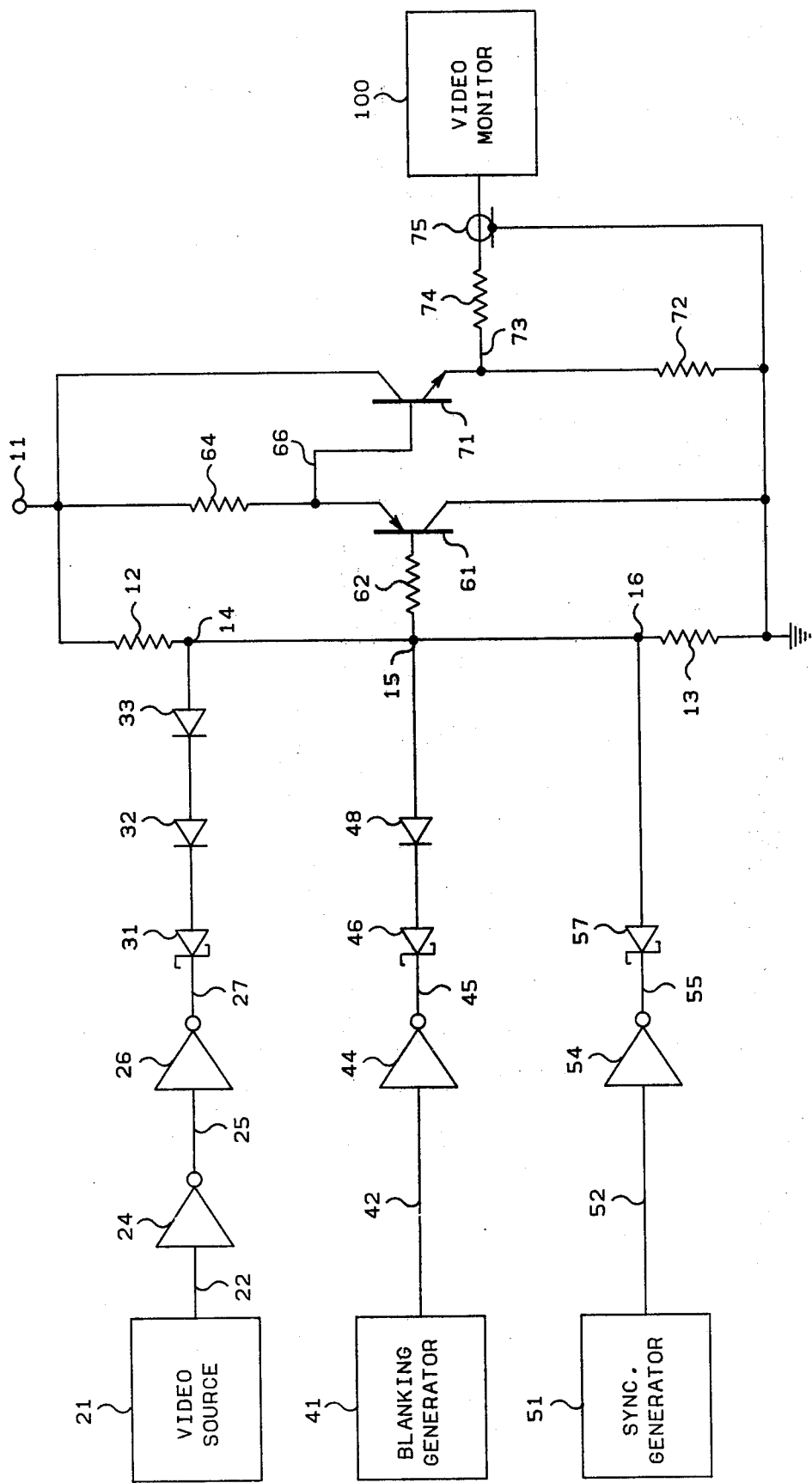
FIG. 1 is a schematic of the composite video waveform generator circuit.

The invention is described in terms of a preferred embodiment wherein a composite video waveform generator is utilized to convert three digital signals representing video data, blanking and synchronization information into a composite vide waveform which is compatible with the requirements of the Electronic Industries Association Standard RS-170. It should be recognized that with simple modifications the waveform generator disclosed could be utilized to form a composite video waveform which would meet other industry standards or which would meet the input requirements of a specific video monitor or other similar device.

Schottky diodes are utilized in the preferred embodiment of the invention. As has been previously stated, the invention is not limited to the use of Schottky diodes. Switching diodes may be substituted for the Schottky diodes if edge definition of the composite video signal is not critical.

In the following description of the circuit, nominal voltages and component values are used. These will vary slightly between devices and as a function of temperature. These variations, as well as the effects of leakage currents, inverter saturation voltage and loading effects of the buffer amplifier on the summing point (nodes 14, 15 and 16), are neglected as the circuit is very tolerant of such variations.

Referring now to the drawings, and in particular to FIG. 1, the power supply 11, which is in this preferred embodiment a +5 volt power supply, supplies power to the composite video waveform generator shown in FIG. 1. The voltage level at nodes 14, 15 and 16, which will all have the same voltage level, is determined by the voltage level of power supply 11 and by the voltage divider network made up of resistors 12 and 13. In this preferred embodiment, resistor 12 is a 330 ohm resistor and resistor 13 is a 680 ohm resistor, thus producing a voltage level of 3.4 volts at nodes 14, 15 and 16.

A digital video data signal 22 having a transistor-transistor logic (TTL) voltage level wherein a high voltage signal corresponds to a logic 1 (high) and a low voltage signal corresponds to a logic 0 (low), is supplied from the video source 21 to the input of inverter 24. Signal 25 which is representative of the inverted video data is supplied to the input of inverter 26. The output signal 27 of inverter 26 thus corresponds to signal 22 from the video source 21. The output of inverter 26 is tied to node 14 through the Schottky diode 31 and switching diodes 32 and 33. The Schottky diode 31 is characterized by a forward voltage drop of 0.5 volts. The switching diodes 32 and 33 are in this preferred embodiment silicon diodes and are characterized by a forward voltage drop of 0.7 volts. When video data signal 22 is high, the output signal 27 from inverter 26 will also be high and no current will flow through the Schottky diode 31 and the switching diodes 32 and 33. Node 14 will thus remain at 3.4 volts which corresponds to a white luminescence level. If the video data signal 22 corresponds to a logic level of 0, the output signal 27 from inverter 26 will be low and the output of inverter 26 will form a current sink allowing current to flow through Schottky diode 31 and switching diodes 32 and 33. This will have the effect of changing the voltage level at node 14 from 3.4 volts to 1.9 volts, which corresponds to the forward voltage drop across the Schottky diode 31 and switching diodes 32 and 33. The 1.9 volt voltage level is utilized as the black luminescence level.

The blanking signal 42 is supplied by the blanking signal generator 41 to the input of inverter 44. The blanking signal 42 is also at a TTL level and is utilized to eliminate the retrace that appears as the video monitor is being scanned. The output of inverter 44 is tied to the node 15 through Schottky diode 46 and switching diode 48. The blanking signal 42 is normally low, thus the output signal 45 from inverter 44 is normally high and no current will flow through Schottky diode 46 and switching diode 48. When it is desired to blank the retrace, blanking signal 42 goes high thus driving signal 45 low. The output of inverter 44 thus forms a current sink and current flows through Schottky diode 46 and switching diode 48, forcing node 15 to a +1.2 volt voltage level which corresponds to the forward voltage drop across Schottky diode 46 and switching diode 48. The 1.2 volt voltage level is utilized as the blanking voltage level.

The synchronization signal 52 is supplied by the synchronization signal generator 51 to the input of inverter 54. Synchronization signal 52 is also at a TTL voltage level and is utilized to synchronize the scanning of the video monitor 100. The output of inverter 54 is tied to node 16 through the Schottky diode 57. The synchronization signal 52 is normally low, thus forcing signal 55 from the output of inverter 54 high. In this state no current will flow through Schottky diode 57. When signal 52 goes high the output of inverter 54 goes low and forms a current sink, allowing current to flow through Schottky diode 57. In this state node 16 will assume a voltage level of 0.5 volts which corresponds to the forward voltage drop across Schottky diode 57. The 0.5 volt level is utilized as the synchronization signal voltage level.

As has been previously stated, nodes 14, 15 and 16 will all be at the same voltage level. The voltage appearing at nodes 14, 15, and 16 is supplied to the base of transistor 61 through resistor 62. The emitter of transistor 61 is tied to power supply 11 through resistor 64. The collector of transistor 61 is tied to ground. The output signal 66 from the emitter of transistor 61 is supplied to the base of transistor 71. The output signal 66 will have a voltage level which is 0.7 volts higher than the voltage level that appears at nodes 14, 15 and 16. The collector of transistor 71 is tied to power supply 11. The emitter of transistor 71 is tied to ground through resistor 72. The output signal 73 from the emitter of transistor 71 is supplied to the coaxial cable 75 through resistor 74. The coaxial cable 75 is tied to the video monitor 100 and supplies the composite video waveform to the video monitor 100. The output signal 73 from the emitter of transistor 71 will have a voltage level which corresponds to the voltage level appearing at nodes 14, 15 and 16 because of the 0.7 V base-emitter drop across transistor 71. Transistors 61 and 71 form a series complementary emitter-follower pair which provides a high impedance buffer for driving the coaxial cable 75. The arrangement of transistors 61 and 71 results in the nonlinearities of the PNP transistor 61 being equal and opposite in polarity of those of the NPN transistor 71 resulting in cancellation. Any variation in the transistors due to temperature variations will also be cancelled. The arrangement of the circuit components provides direct coupling of all signal paths through the circuit. In this preferred embodiment, resistor 74 is a 68 ohm resistor which increases the output impedance of transistor 71, thus preventing oscillation in the event an unterminated coaxial cable 75 is connected. Resistor 74 also protects the circuit from damage resulting from shorting the output.

An example of a composite video waveform which could be generated by the circuit shown in FIG. 1 is illustrated in FIG. 2. The video monitor 100, in this preferred embodiment, has 24 rows with 80 characters per row. The video monitor 100 is scanned horizontally left to right from character 1 to character 80. The video monitor 100 is simultaneously scanned at a slower rate from top to bottom of the screen. During each left to right scan the CRT electron beam is switched from the white 105 to the black 104 luminance level by video data 22 supplied to the video input inverter 24. When the video monitor 100 has scanned past character 80, the blanking signal 42 is applied to the blanking input inverter 44, reducing the electron beam luminance to the blanking level 101. The synchronization signal 52 is applied to the synchronization inverter 54 input shortly after application of the blanking signal 42 occurs as shown in FIG. 2. The synchronization signal 52 causes the video monitor 100 to return the electron beam to the left edge of the CRT screen. In this preferred embodiment, the horizontal scanning is repeated ten times for each row of characters displayed on the video monitor 100. When 24 rows of characters (240 horizontal scans) have been displayed, the blanking signal 42 and synchronization signal 52 are generated in a manner similar to that described above, but with longer time duration. During this time period the electron beam is returned from the lower right to the upper left corner of the video monitor 100 screen. The entire scanning process is then repeated.

The invention has been described in terms of its presently preferred embodiment as is shown in FIG. 1. For the sake of convenience, signals which supply power to the various chips shown in the schematic of FIG. 1 have been omitted. Voltage levels required by various chips are specified by the manufacturers and are well known to those familiar with the art.

Many different circuit configurations are possible which would perform the functions required of the circuits shown in FIG. 1. This figure is illustrative of a particular circuit configuration which will perform the required function.

Specific components which are available commercially and which can be used in the practice of the invention as shown in FIG. 1 follow. Values of resistors used in these particular circuits are also given. Again, many different combinations of circuit values, particularly in the area of resistance values are possible.

Inverters 24,26,44,54—SN74S04N, Texas Instruments
Transistor 61—2N3905, Texas Instruments
Transistor 71—2N3904, Texas Instruments
Resistor 12—330Ω, RN55D3300F, Dale
Resistor 13—680Ω, RN55D6800F, Dale
Resistor 62—220Ω, RN55D2200F, Dale
Resistors 64, 72—1 KΩ, RN55D1001F, Dale
Resistor 74—68Ω, RN55D0680F, Dale
Schottky diodes 31,46,57—MBD501, Motorola
Diodes 32,33,48—IN914, Fairchild Semiconductor While the invention has been described in terms of the presently preferred embodiments, reasonable variations and modifications are possible by those skilled in the art, within the scope of the described invention and the appended claims. Modifications such as utilizing an extra diode in the video data line to achieve a grey level voltage or elimination of the blanking signal are considered within the scope of the invention.

That which is claimed is:

1. Apparatus comprising:
   a first diode circuit having a cathode side and an anode side;
   a video monitor means;
   means for supplying a digital video data signal having first and second voltage levels to the cathode side of said first diode circuit;
   means for supplying a third voltage level to the anode side of said first diode circuit;
   means for providing a high impedance at the cathode side of said first diode circuit, when said digital video data signal assumes said first voltage level, in such a manner that the anode side of said first diode circuit remains at said third voltage level thus generating a first signal, having said third voltage level, which corresponds to a first video level for said video monitor means;
   means for providing a current sink at the cathode side of said first diode circuit, when said digital video data signal assumes said second voltage level, in such a manner that current flows from the anode side of said first diode circuit to the cathode side of said first diode circuit causing the anode side of said first diode circuit to assume a fourth voltage level, which corresponds to the forward voltage drop across said first diode circuit, thus generating a second signal, having said fourth voltage level, which corresponds to a second video level for said video monitor means;
   means for combining said first signal and said second signal to form a composite video waveform; and
   means for supplying said composite video waveform to said video monitor means.

2. Apparatus in accordance with claim 1 additionally comprising:
   a second diode circuit having a cathode side and an anode side;
   means for supplying a digital synchronization signal having fifth and sixth voltage levels to the cathode side of said second diode circuit;
   means for supplying said third voltage level to the anode side of said second diode circuit; and
   means for providing a current sink at the cathode side of said second diode circuit, when said digital synchronization signal assumes said fifth voltage level, in such a manner that current flows from the anode side of said second diode circuit to the cathode side of said second diode circuit, causing the anode side of said second diode circuit to assume a seventh voltage level, which corresponds to the forward voltage drop across said second diode circuit, thus generating a third signal, having said seventh voltage level, which corresponds to a synchronization signal level for said video monitor means, wherein said means for combining said first signal and said second signal to form said composite video waveform comprises means for combining said first signal, said second signal, and said third signal to form said composite video waveform.

3. Apparatus in accordance with claim 2 additionally comprising:
   a third diode circuit having a cathode side and an anode side;
   means for supplying a digital blanking signal having eighth and ninth voltage levels to the cathode side of said third diode circuit;
   means for supplying said third voltage level to the anode side of said third diode circuit; and
   means for providing a current sink at the cathode side of said third diode circuit, when said digital blanking signal assumes said eighth voltage level, in such a manner that current flows from the anode side of said third diode circuit to the cathode side of said third diode circuit, causing the anode side of said third diode circuit to assume a tenth voltage level, which corresponds to the forward voltage drop across said third diode circuit, thus generating a fourth signal, having said tenth voltage level, which corresponds to a blanking signal level for said video monitor means, wherein said means for combining said first signal and said second signal to form said composite video waveform comprises means for combining said first signal, said second signal, said third signal and said fourth signal to form said composite video waveform.

4. Apparatus in accordance with claim 3 wherein at least one diode in each of said first diode circuit, said second diode circuit, and said third diode circuit is a Schottky diode.

5. Apparatus in accordance with claim 3 additionally comprising:
   first inverter means utilized to buffer said blanking signal;
   means for supplying said blanking signal to the input of said first inverter means; and
   means for supplying a fifth signal, which is the inverted form of said blanking signal, from the output of said first inverter means to the cathode side of said third diode circuit.

6. Apparatus in accordance with claim 3 wherein said third diode circuit comprises a Schottky diode and a conventional silicon switching diode connected in series.

7. Apparatus in accordance with claim 2 additionally comprising:
   first inverter means utilized to buffer said digital synchronization signal;
   means for supplying said synchronization signal to the input of said first inverter means; and
   means for supplying a fourth signal, which is the inverted form of said synchronization signal, from the output of said first inverter means to the cathode side of said second diode circuit.

8. Apparatus in accordance with claim 2 wherein said second diode circuit comprises a Schottky diode.

9. Apparatus in accordance with claim 1 additionally comprising first and second inverter means utilized to buffer said digital video data signal and to provide a high impedance or a current sink at the cathode side of said first diode circuit in response to said digital video data signal;
   means for supplying said digital video data signal to the input of said first inverter means;
   means for supplying a third signal, which is the inverted form of said digital video data signal, from the output of said first inverter means to the input of said second inverter means; and
   means for supplying a fourth signal which is representative of said digital video data signal from the output of said second inverter means to the cathode side of said first diode circuit.

10. Apparatus in accordance with claim 1 wherein said means for supplying said composite video waveform to said data monitor means comprises first and second transistors connected in series so as to form a series-complementary emitter-follower pair which is utilized to provide a high impedance buffer for supplying said composite video waveform to said data monitor means.

11. Apparatus in accordance with claim 10 additionally comprising:
   a coaxial cable utilized to tie the output of said second transistor to said data monitor means; and
   a resistor which is utilized to increase the output impedance of said second transistor to prevent oscillation if said coaxial cable is unterminated.

12. Apparatus in accordance with claim 1 wherein said first diode circuit comprises a Schottky diode and two conventional silicon switching diodes all connected in series.

* * * * *